United States Patent
Zierden et al.

(10) Patent No.: US 11,484,019 B1
(45) Date of Patent: Nov. 1, 2022

(54) SYSTEM FOR RESTRICTING AIR FLOW INTO AN ICE FISHING STRUCTURE

(71) Applicants: Dean Zierden, Britton, SD (US); Dan Zierden, Fergus Falls, MN (US)

(72) Inventors: Dean Zierden, Britton, SD (US); Dan Zierden, Fergus Falls, MN (US)

( * ) Notice: Subject to any disclaimer, the term of this patent is extended or adjusted under 35 U.S.C. 154(b) by 131 days.

(21) Appl. No.: 16/817,702

(22) Filed: Mar. 13, 2020

(51) Int. Cl.
*A01K 97/01* (2006.01)
*E04H 15/56* (2006.01)
*E04H 15/00* (2006.01)
*E04H 15/58* (2006.01)

(52) U.S. Cl.
CPC .......... *A01K 97/01* (2013.01); *E04H 15/001* (2013.01); *E04H 15/56* (2013.01); *E04H 15/58* (2013.01)

(58) Field of Classification Search
CPC ...... A01K 97/01; A01K 97/12; E04H 15/001; E04H 15/56; E04H 15/58
USPC .......................................................... 43/4, 17
See application file for complete search history.

(56) References Cited

U.S. PATENT DOCUMENTS

| | | | | |
|---|---|---|---|---|
| 1,253,746 A | * | 1/1918 | Teeling | A01K 97/125 43/17 |
| 2,877,595 A | * | 3/1959 | Steuart | A01K 97/01 43/56 |
| 2,914,926 A | * | 12/1959 | Meagher | A01K 97/01 299/24 |
| 2,991,623 A | * | 7/1961 | Morton | A01K 97/01 405/61 |
| 3,056,272 A | * | 10/1962 | Eilers | A01K 97/01 249/79 |
| 3,059,451 A | * | 10/1962 | Anderson | F25C 1/22 249/66.1 |
| 3,204,630 A | * | 9/1965 | Rydeen | A01K 97/01 126/360.1 |
| 3,224,150 A | * | 12/1965 | Burtoft | E04H 15/22 52/2.14 |

(Continued)

OTHER PUBLICATIONS

9" Ice House Hole Sleeve, The Catch Cover Store, 5 pages, https://catchcover.com/products/9-Ice-House-Hole-Sleeve.html, download date Feb. 4, 2020.

(Continued)

*Primary Examiner* — Darren W Ark
*Assistant Examiner* — Kevin M Dennis
(74) *Attorney, Agent, or Firm* — Jeffrey A. Proehl; Woods, Fuller, Shultz & Smith, PC (57) ABSTRACT

A system for closing a gap associated with an opening in a floor of an ice fishing structure. The system may include an ice hole sleeve for removably positioning in the opening of the floor to extend down toward an upper ice surface. The ice hole sleeve has a top with an upper sleeve opening and a bottom with a lower sleeve opening. The ice hole sleeve includes a sleeve wall for extending through the opening of the floor and downwardly from the floor. The sleeve wall has a sleeve inward face and a sleeve outward face on opposite sides of the sleeve wall. The system may further include a gap closing device having a tubular configuration with an endless circumference and being positioned on the sleeve outward face of the ice hole sleeve to facilitate closure of a gap associated with the opening in the floor. The gap closing device may be resiliently compressible and stretchable in a circumferential direction to increase a circumferential length of the device.

18 Claims, 5 Drawing Sheets

(56) References Cited

U.S. PATENT DOCUMENTS

| | | | | |
|---|---|---|---|---|
| 3,507,268 A * | 4/1970 | Anderson | A01K 97/01 126/271.3 |
| 3,555,827 A * | 1/1971 | Herr | A01K 97/01 405/61 |
| 3,698,117 A * | 10/1972 | Wiltse | A01K 97/01 43/17 |
| 3,745,689 A * | 7/1973 | Williams | A01K 97/01 43/17 |
| 4,114,304 A * | 9/1978 | Hedlund | A01K 97/01 126/360.1 |
| 4,218,840 A * | 8/1980 | Cohee | A01K 97/01 16/108 |
| 4,294,030 A * | 10/1981 | Stewart | A01K 97/01 126/271.3 |
| 4,438,757 A * | 3/1984 | Anderson | A01K 97/01 126/343.5 R |
| 4,662,099 A * | 5/1987 | Stewart | A01K 97/01 43/17 |
| 4,747,226 A * | 5/1988 | Todd | A01K 97/01 43/4 |
| 4,761,909 A * | 8/1988 | Christian | A01K 97/01 43/4.5 |
| 4,780,979 A * | 11/1988 | Dyck | A01K 97/01 43/17 |
| 4,845,875 A * | 7/1989 | Norwick | A01K 97/01 43/4 |
| 4,862,627 A * | 9/1989 | Keller | A01K 97/01 43/17 |
| 4,910,906 A * | 3/1990 | Schefers | A01K 97/01 43/4.5 |
| 4,953,317 A * | 9/1990 | Ruchel | A01K 97/01 43/17 |
| 5,044,108 A * | 9/1991 | Rinehart | A01K 97/01 43/17 |
| 5,048,220 A * | 9/1991 | Harris | A01K 97/01 43/55 |
| 5,419,073 A * | 5/1995 | Kline, Sr. | A01K 97/01 43/4 |
| 5,598,656 A * | 2/1997 | Strasser | A01K 97/01 43/17 |
| 6,526,689 B2 * | 3/2003 | Moore | A01K 97/01 43/4 |
| 6,675,523 B1 * | 1/2004 | Huiras | A01K 97/01 43/4 |
| 6,684,553 B1 * | 2/2004 | Holum | A01K 97/01 43/4 |
| 6,694,662 B1 * | 2/2004 | McClure | A01K 97/01 43/4 |
| 6,909,845 B1 * | 6/2005 | Schillinger | G03B 15/00 348/E5.025 |
| 8,201,356 B2 * | 6/2012 | Harris | A01K 97/01 43/4 |
| 8,943,735 B2 * | 2/2015 | Brown | A01K 97/01 43/4.5 |
| 10,337,661 B2 * | 7/2019 | Kor | F16L 59/029 |
| 10,575,511 B2 * | 3/2020 | Schramski | A01K 97/01 |
| 10,648,608 B2 * | 5/2020 | Kor | F17C 1/12 |
| 2002/0088164 A1 | 7/2002 | Koepke | A01K 97/01 43/1 |
| 2012/0233905 A1 | 9/2012 | Holt | |
| 2012/0291332 A1 * | 11/2012 | Nolt | A01K 97/01 43/17 |
| 2016/0366869 A1 * | 12/2016 | Schramski | A01K 97/01 |
| 2017/0265446 A1 * | 9/2017 | Dungan | A01K 97/12 |
| 2018/0206469 A1 | 7/2018 | Dungan | |
| 2018/0259114 A1 * | 9/2018 | Kor | F25D 3/02 |

OTHER PUBLICATIONS

Catch Cover 4"-10" Hole Sleeve, Hardkor Outdoors LLC, 2 pages, https://hardkor-outdoors-llc.square.site/product/catch-cover-4-10-hole-sleeve.html, download date Mar. 6, 2020.

Fish Hole Buddy 7"x15" Hole Sleeve, Hardkor Outdoors LLC, 2 pages, https://hardkor-outdoors-llc.square.site/product/fish-hole-buddy-7-15-hole-sleeve.html, download date Feb. 4, 2020.

Original Round Catch Cover, The Catch Cover Store, 5 pages, https://catchcover.com/products/Original-Round-Catch-Cover.html, download date Feb. 4, 2020.

* cited by examiner

SYSTEM FOR RESTRICTING AIR FLOW INTO AN ICE FISHING STRUCTURE

BACKGROUND

Field

The present disclosure relates to ice fishing and related apparatus, and more particularly pertains to a new system for restricting air flow into an ice fishing structure by minimizing at least one gap associated with the opening in the floor of the structure through which environmental air may enter the interior of the structure.

SUMMARY

In one aspect, the present disclosure relates to a system for situating relative to a hole formed in a layer of ice extending over a body of water, with the layer of ice having an upper ice surface. The system may comprise an ice fishing apparatus for positioning above the layer of ice adjacent to the hole, and the ice fishing apparatus may include a floor configured to being positioned in an elevated condition spaced above the upper ice surface of the layer of ice. The floor has an opening which may be positioned in registration with the hole formed in the layer of ice. The ice fishing apparatus may also include an ice hole sleeve removably positioned in the opening of the floor to extend down toward the upper ice surface, and the ice hole sleeve has a top with an upper sleeve opening and a bottom with a lower sleeve opening. The ice hole sleeve may include a sleeve wall extending through the opening of the floor and extending downwardly from the floor, and the sleeve wall has a sleeve inward face and a sleeve outward face on opposite sides of the sleeve wall. The system may further include a gap closing device having a tubular configuration with an endless circumference and being positioned on the sleeve outward face of the ice hole sleeve to facilitate closure of a gap associated with the opening in the floor.

In another aspect, the present disclosure relates to an ice fishing apparatus for closing a gap associated with an opening in a floor of an ice fishing structure. The apparatus may comprise an ice hole sleeve for removably positioning in the opening of the floor to extend down toward an upper ice surface, with the ice hole sleeve having a top with an upper sleeve opening and a bottom with a lower sleeve opening. The ice hole sleeve may include a sleeve wall for extending through the opening of the floor and downwardly from the floor. The sleeve wall may have a sleeve inward face and a sleeve outward face on opposite sides of the sleeve wall. A gap closing device may have a tubular configuration with an endless circumference and may be positioned on the sleeve outward face of the ice hole sleeve to facilitate closure of a gap associated with the opening in the floor. The gap closing device may be resiliently compressible and stretchable in a circumferential direction to increase a circumferential length of the device.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

With reference now to the drawings, and in particular to FIGS. 1 through 9 thereof, a new system for restricting air flow into an ice fishing structure embodying the principles and concepts of the disclosed subject matter will be described.

"Ice houses" or "ice shacks" are often moved on to the ice overlying a body of water in the winter months in order to protect the ice fishermen and women from the elements present on the lake while fishing through a hole in the layer of ice. Typically, the floor of the house or shack has an opening aligned with the hole in the ice in order to reach the water underneath the ice. Unfortunately, the opening in the floor presents an opportunity for the cold environmental air to enter the interior of the enclosure because the floor deck is supported by joist framing, and the floor itself may be supported on an axle and wheels for portability, any of which will produce a space between the floor deck and the upper surface of the ice. Environmental air, and in particular wind, is able to move in the space between the floor deck and the upper ice surface to reach the opening in the floor.

Attempts to close the gap between the floor opening and the ice hole have only been partially successful. For example, an ice hole sleeve may be inserted downwardly through the floor opening to bridge the gap between the floor deck and the upper ice surface, but gaps between the ice hole sleeve and the floor, as well as between the ice hole sleeve and the upper ice surface may still exist due to the irregularity of the upper ice surface as well as the fact that the floor deck is rarely oriented perfectly parallel to the upper ice surface. As a result, annular or ring-shaped gaps may occur between the edge of the floor deck forming the floor opening and the ice hole sleeve as well as between the upper ice surface and the lower end of the ice hole sleeve. The upper end of the ice hole sleeve may have an annular flange for resting on the portion of the floor around the opening, but again the air regular ice surface, any skew between the plane of the floor in the upper ice surface, as well as variations in the distance between the upper ice surface and the floor can all reduce the effectiveness of the flange to close the gap.

One approach has been to replace the relatively rigid ice hole sleeve with a sleeve which is formed of a flexible and somewhat limp material that incorporates some insulative material, but the material of the sleeve is vulnerable to be snagged or caught by ice fishing apparatus moved into and out of the hole, including hooks.

In one aspect, the disclosure relates to a system 1 for situating relative to a hole 2 which is formed in a layer 3 of ice extending over a body of water 4. Typically, the layer 3 of ice has an upper ice surface 5 on which ice fishing apparatus 10, as well as persons engaged in ice fishing, may be supported.

In greater detail, the ice fishing apparatus 10 is suitable for positioning above, and generally resting upon, the layer 3 of ice adjacent to the hole 2 formed in the layer 3. The ice fishing apparatus 10 may include, for example, a floor 12 which is positioned in an elevated condition above the upper ice surface 5 of the layer 3, and the elevated condition may create a space therebetween. The floor 12 may be a portion of a larger structure, such as ice fishing "house" or "shack" or similar structure positioned above the floor 12 and typically enclosing a space above the floor for protection against the elements such as air temperature and air movement, or wind. In some embodiments, a frame of elements may be positioned below the floor 12 to strengthen and rigidify the boards forming the deck of the floor.

The floor 12 may have an opening 14 which is positionable in alignment or registration with the hole 2 formed in the layer 3 of ice such that the opening 14 is substantially centered with respect to the hole 2 such that ice fishing apparatus may be passed through the opening 14 and into the hole 2. The floor 12 has an upper floor surface 16 and a lower floor surface 17, and the opening 12 may extend between the upper 16 and lower 17 floor surfaces. The lower floor surface may face the upper ice surface 5, and in many cases a space of some size exists between the lower floor surface and the upper ice surface. An edge 18 of the material forming the floor 12 deck, such as a plywood board, may define the opening 14, and often the edge will have a substantially circular shape which generally corresponds to the circular shape of a hole 2 formed in the ice by an ice auger.

The ice fishing apparatus 10 may also include an ice hole sleeve 20 which is positionable in the opening 14 of the floor to extend down toward the upper ice surface 5. The ice hole sleeve 20 may have a top 22 and a bottom 23, with the top generally being positioned adjacent to the floor and the bottom being positioned adjacent to the upper ice surface. An upper sleeve opening 24 of the sleeve 20 may be located at the top 22 and a lower sleeve opening 26 may be located at the bottom 23 to permit relatively free movement of ice fishing apparatus through the ice hole sleeve to the hole 2.

The ice hole sleeve 20 may include a sleeve wall 30 which may be extended through the opening 14 of the floor and also downwardly from the floor toward the ice layer 3. The sleeve wall may extend from the top 22 to the bottom 23 of the sleeve 20. The sleeve wall 30 may have a sleeve inward face 32 and a sleeve outward face 34 located on opposite sides of the sleeve wall 30. The sleeve wall may have a lower rim which forms the lower sleeve opening 26 and is positionable closely adjacent to, and sometimes in contact with, the upper ice surface 5. In many embodiments, the sleeve wall 30 may have an inverted substantially frustaconical shape. The ice hole sleeve 20 may also include a sleeve flange 36 located at the top 22 of the sleeve 20 and which extends outwardly from the sleeve wall 30 for resting upon the upper floor surface of the floor. The sleeve flange 36 may have a bottom face 38 for contacting the upper floor surface 16 of the floor. In a typical configuration, the sleeve flange 36 may extend in a plane and have an annular shape.

In some embodiments, the ice fishing apparatus 10 may also include an ice hole ring 40 which may be inserted into the opening 14 in the floor 12 for interposing between the ice hole sleeve 20 and the opening 14 in the floor, and may be relatively permanently mounted on the floor to removably receive the ice hole sleeve 20. In greater detail, the ice hole ring 40 may include a ring wall 42 which extends through the opening 14 in the floor and may extend downwardly to a limited degree from lower floor surface 17 of the floor. The ring wall 42 may have a ring inward face 44 which in some embodiments may be substantially cylindrical in shape. The ring wall 42 may have a ring outward face 45 located opposite of the ring inward face on the wall for orienting toward the edge 18 of the floor. In many embodiments, the ring outward face may also be substantially cylindrical in shape. The ice hole ring 40 may also include a ring flange 46 which extends outwardly from the ring wall 42 for resting upon the upper floor surface 16 of the floor. The ring flange 46 may have a bottom face 48 for contacting the upper floor surface, and the ring flange may receive fasteners which mount the ring 40 to the floor in a manner that resists removal.

In some further embodiments, the ice fishing apparatus 10 may also include a hole cover 50 which is configured to removably cover the opening 14 in the floor during periods in which ice fishing activity is not being conducted. The hole cover 50 may be removably positionable on the ice hole ring 40 and/or the ice hole sleeve 20. Illustratively, the hole cover 50 may include a disk portion 52 which has a peripheral edge 54 and a peripheral edge section 56 which extends along, and radially inwardly from, the peripheral edge 54.

The hole cover 50 may also include a peripheral wall portion 58 which is at least partially positionable in the opening 14 of the floor to help keep the cover in alignment with the opening. The peripheral wall portion 58 may extend from the peripheral edge section 56 of the disk portion 52, and may be oriented substantially perpendicular to the peripheral edge section. In many useful embodiments, the peripheral wall portion 58 has a substantially cylindrical shape but in any case generally corresponds to the shape of the opening 14.

Significantly, the system 1 may include, either alone or in combination with the ice fishing apparatus 10, a gap closing device 60 which is configured to facilitate closure of a gap associated with the opening 14 in the floor. The gap closing device 60 may function to partially or fully block the flow of air through the opening 14 from the environment below the floor 12 and into the environment above the floor, which may be enclosed for the comfort of the persons involved in ice fishing through the hole 2. Control, such as prevention, of airflow through one or more gaps in the ice fishing apparatus 10 and through the floor may help to keep the enclosed environment above the floor relatively warmer than if air is able to flow freely through the various gaps.

Figure 1:
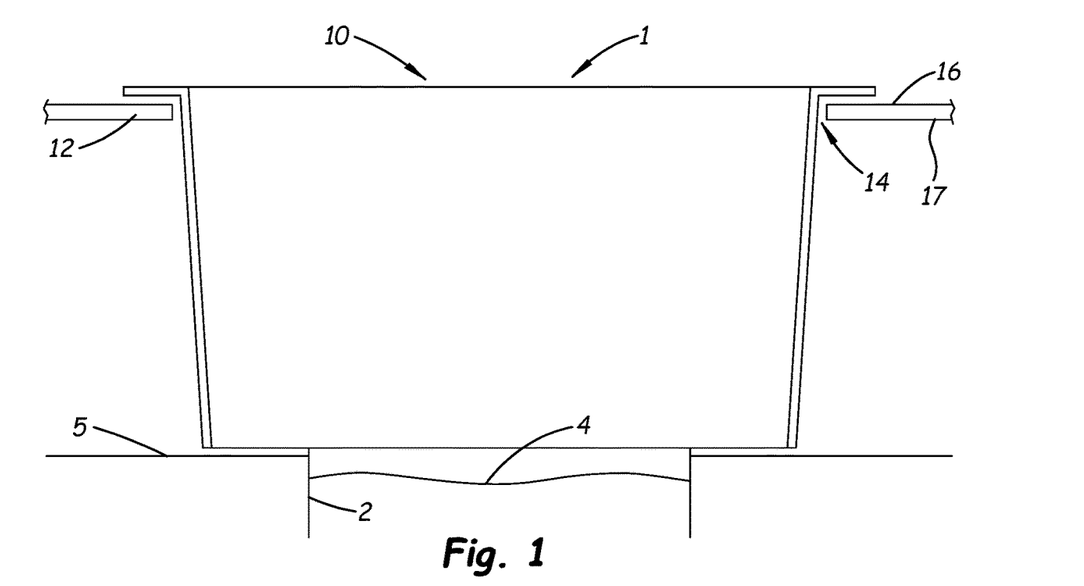
FIG. 1 is a schematic sectional view of an ice fishing apparatus without the gap closing device of the new system for restricting air flow into an ice fishing structure according to the present disclosure.
Figure 2:
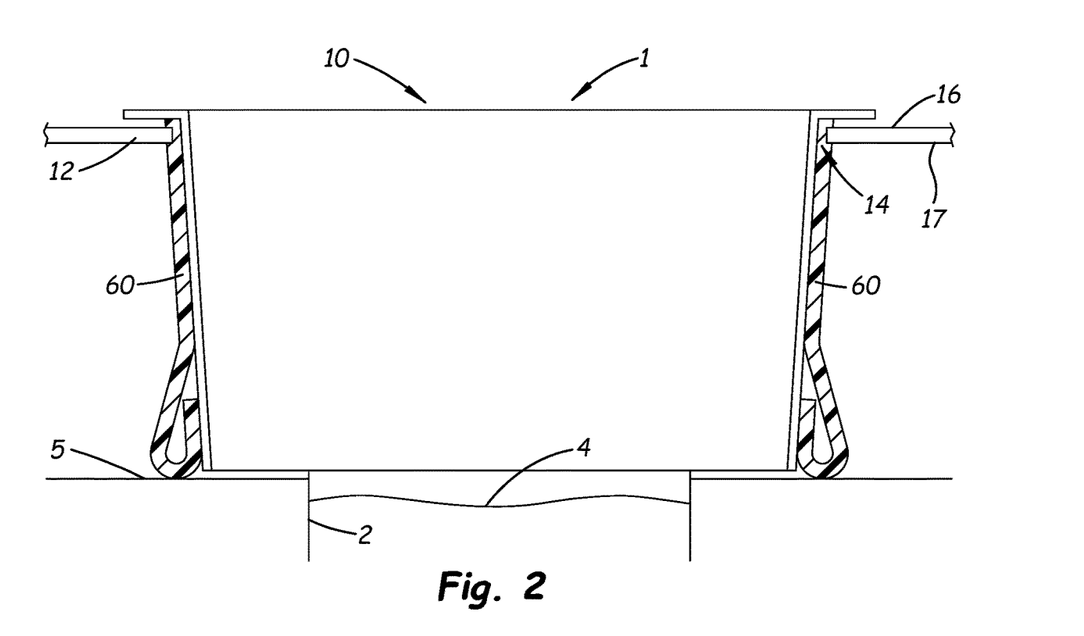
FIG. 2 is a schematic sectional view of the ice fishing apparatus with the gap closing device of the system, according to an illustrative embodiment.
Figure 3:
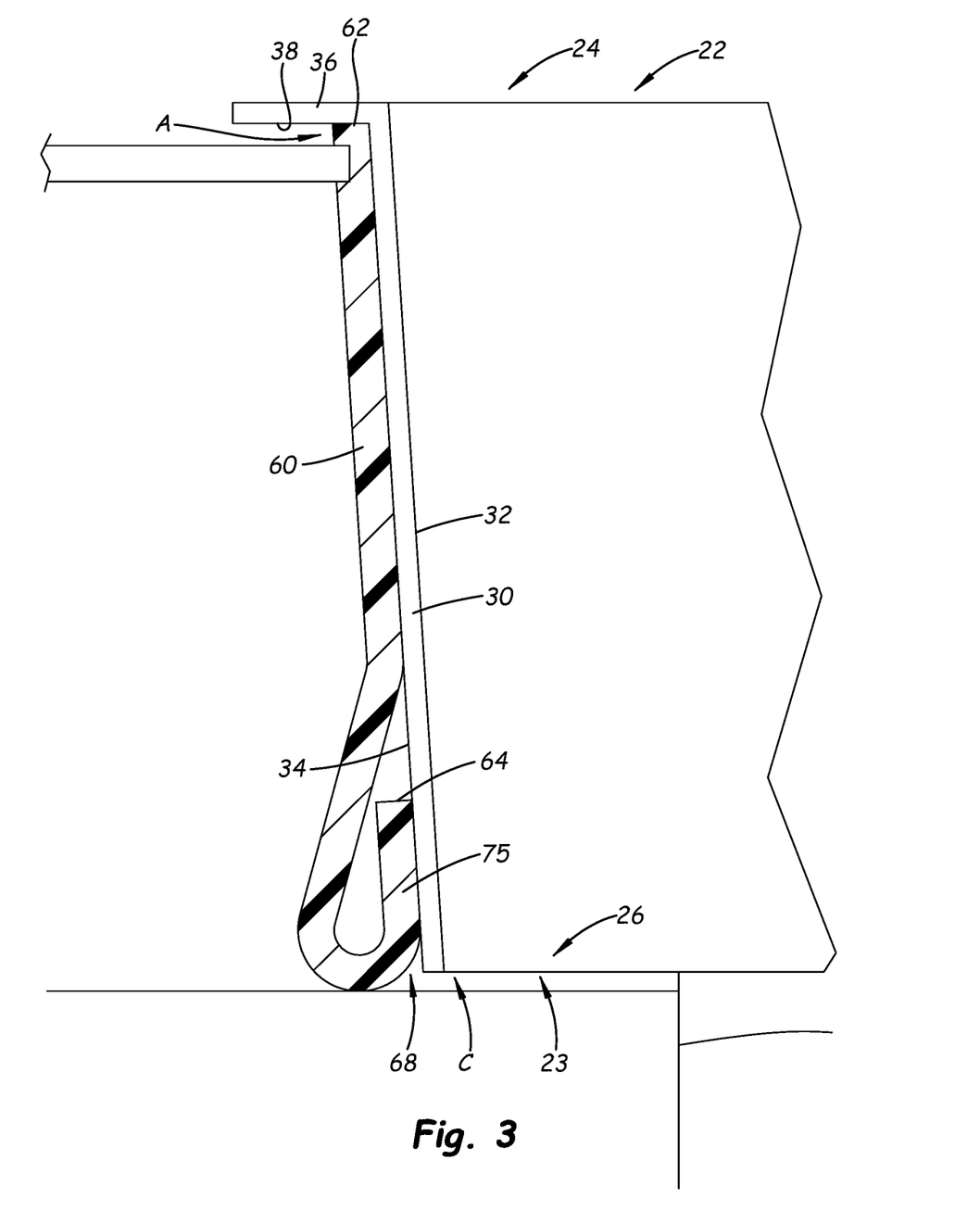
FIG. 3 is a portion of the structure shown in FIG. 2 enlarged to show detail of the structure, according to an illustrative embodiment.
Figure 4:
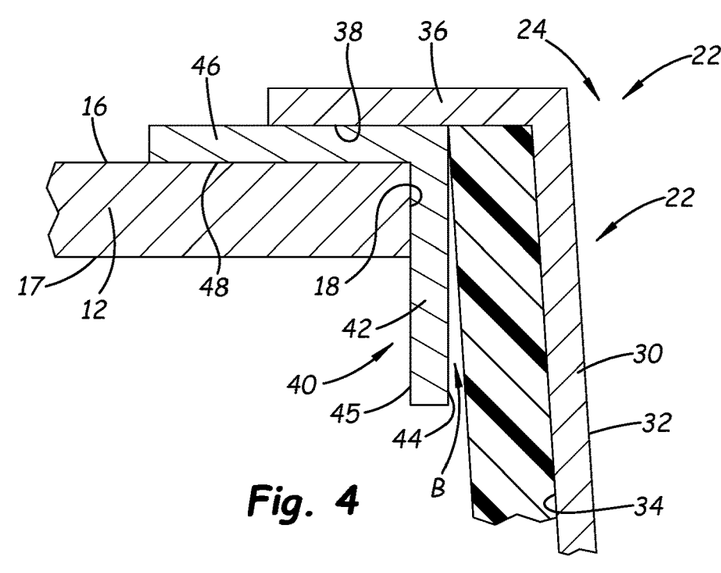
FIG. 4 is another sectional view of a portion of the ice fishing apparatus including an ice hole ring with the ice hole sleeve and the gap closing device of the system, according to an illustrative embodiment.
Figure 5:
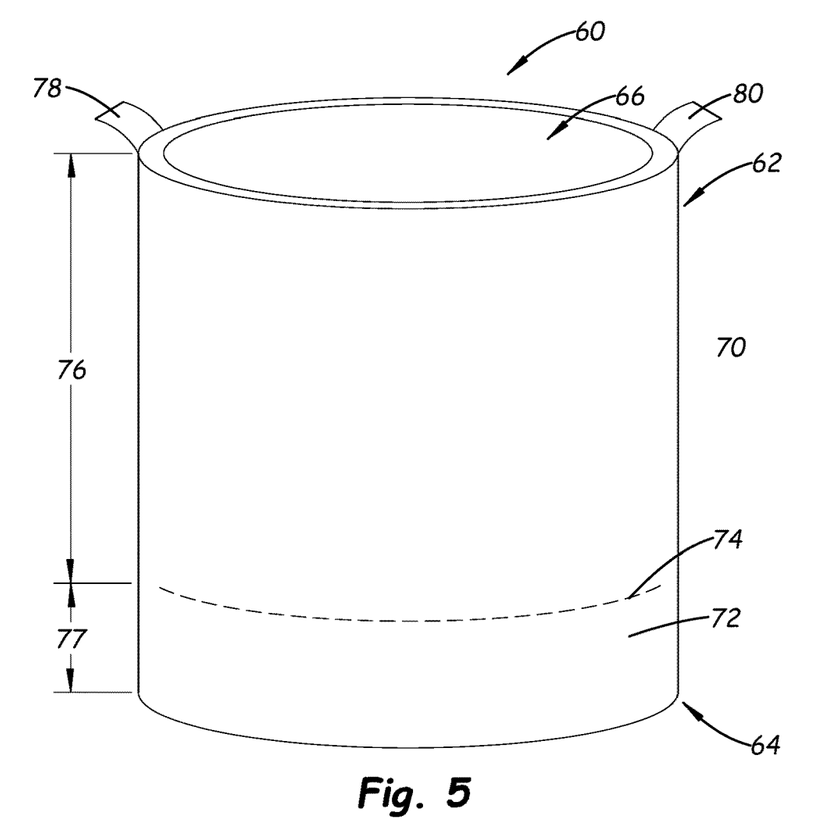
FIG. 5 is a schematic perspective view of the gap closing device isolated from elements of the ice fishing apparatus, according to an illustrative embodiment.
Figure 6:
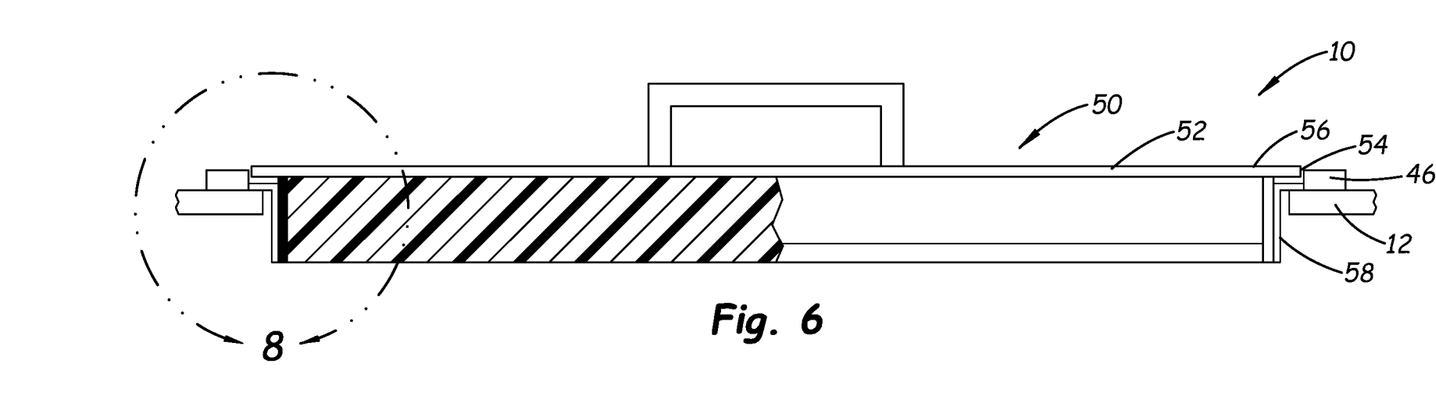
FIG. 6 is a schematic sectional view of a hole cover on the ice hole ring in the opening in the floor, with the second part of the gap closing device in an illustrative position with respect to the hole cover, according to an illustrative embodiment.
Figure 7:
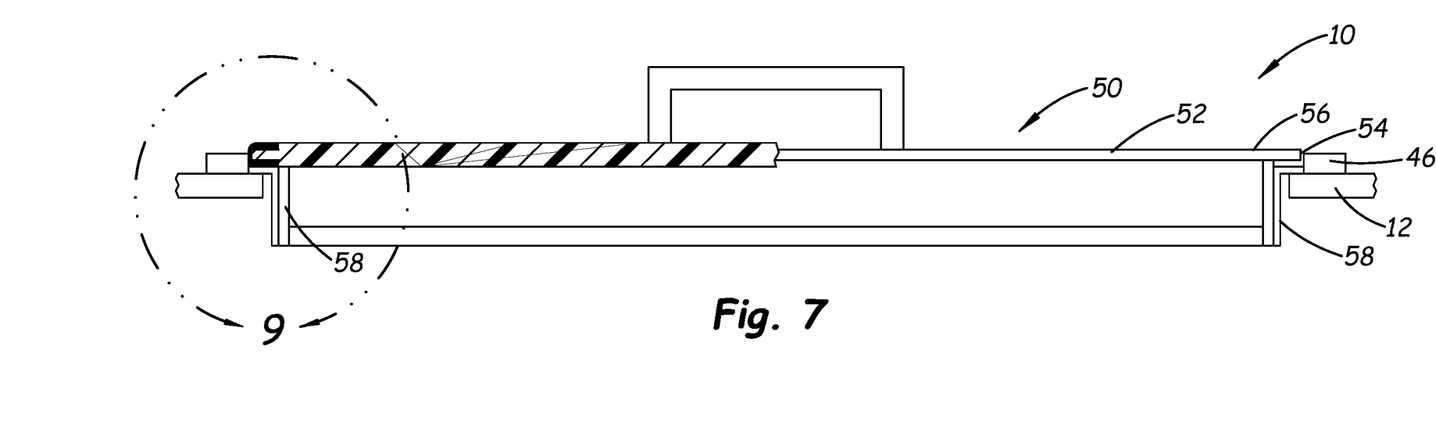
FIG. 7 is a schematic sectional view of the hole cover on the ice hole ring in the opening in the floor, with the second part of the gap closing device in another illustrative position with respect to the hole cover, according to an illustrative embodiment.
Figure 8:
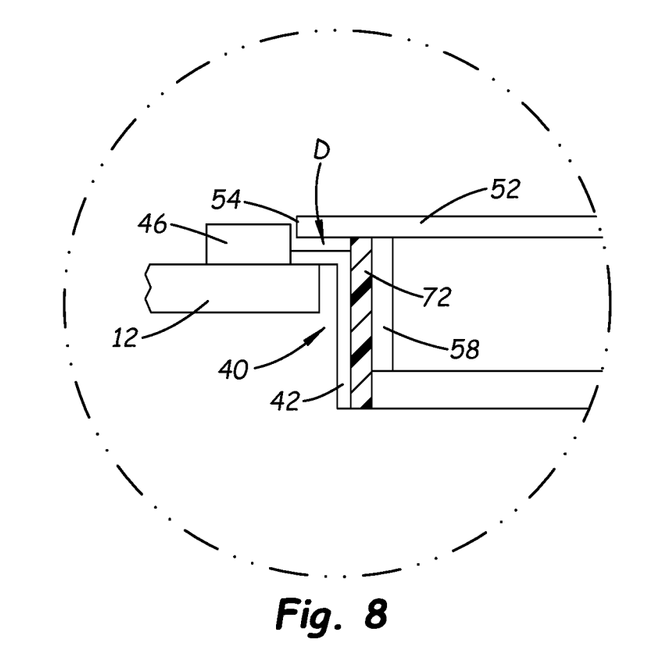
FIG. 8 is an enlarged view of a portion of FIG. 6, according to an illustrative embodiment.
Figure 9:
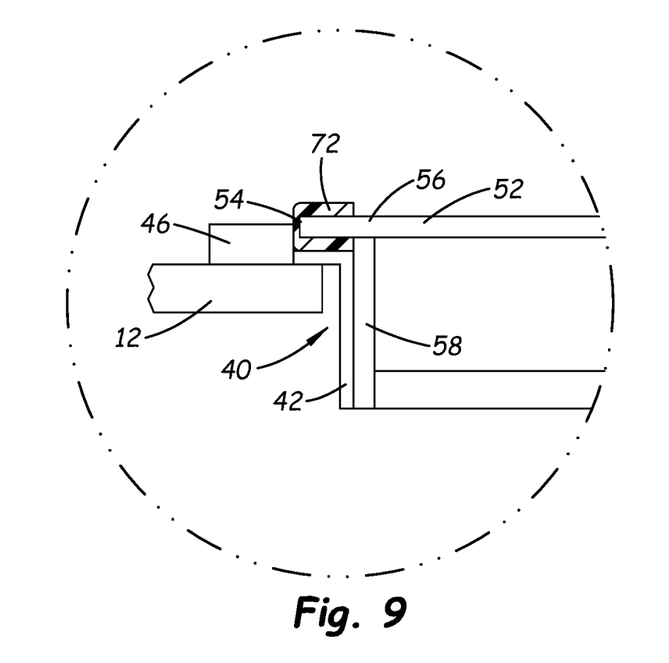
FIG. 9 is an enlarged view of a portion of FIG. 7, according to an illustrative embodiment.

In some implementations, the gap closing device 60 may be configured to facilitate closure of a gap A that may exist between the ice hole sleeve 20 and the floor 12 (see, e.g., FIG. 3), and/or closure of a gap B that may exist between the ice hole sleeve and the ice hole ring 40 (see, e.g., FIG. 4). The gap closing device 60 may also configured to facilitate closure of the gap C that may exist between the bottom 23 of sleeve 20 and the upper ice surface 5 (see, e.g., FIG. 3). In some further implementations, the gap closing device 60 may be configured to facilitate closure of a gap D that may exist between the hole cover 50 and the opening 14 and the floor, or between the hole cover and the ice hole ring 40 when the ring is utilized in the floor opening (see, e.g., FIG. 8).

The gap closing device 60 may be positionable on the ice hole sleeve 20, and may be in contact with the sleeve outward face 34 so that when the ice hole sleeve is inserted into the opening 14 in the floor, the device 60 is positioned between the sleeve wall 30 and the edge 18 forming the floor opening, or may be positioned between the sleeve wall 30 and the ring wall 42 of the ice hole ring 40.

The gap closing device 60 may have a tubular configuration with an endless circumference. The device 60 may have a first end 62 and a second end 64, and a distance between the first end and the second end may define a length of the gap closing device. The gap closing device 60 may also have a first end opening 66 located at the first end 62, and a second end opening 68 located at the second end 64. The distance between opposite points on the first end opening 66 may define a first width of the gap closing device, and the distance between opposite points on the second end opening 68 may define a second with of the gap closing device. In some of the most preferred embodiments, the first width and the second width may be substantially equal to each other. The first and/or second width of the device may provide a diameter that is substantially equal to the diameter of the outward face 34 of sleeve wall 30.

The gap closing device 60 may be resiliently compressible, and may be at least partially formed of a resiliently compressible material to provide such a characteristic. The gap closing device 60 may also be stretchable in a circumferential direction to permit an increase in the circumferential length of the device, and may at least partially be formed of a stretchable material to provide such a characteristic. In some illustrative embodiments, the material of the gap closing device 60 may comprise neoprene or polychloroprene which may be highly suitable for providing the disclosed characteristics.

The material forming the gap closing device 60 may have a thickness, and in some embodiments the thickness may measure between approximately 3 mm and approximately 8 mm, with one highly suitable configuration having a thickness of approximately 5 mm. It is been found that thicknesses less than about 3 mm may be often inadequate to fill the gaps that commonly occur in this environment, and thicknesses greater than about 8 mm may be too thick to fit between the cooperating parts.

In some embodiments, the gap closing device 60 may be configured to separate into two parts, such as a first part 70 and a second part 72, with each of the parts having a tubular configuration. The first part 70 may have the first end 62 and the second part 72 may have the second end 64. The gap closing device 60 may have a line of weakness 74 formed into the material which permits the gap closing device to be separated into the two parts 70, 72 from a single piece. The line of weakness 74 may extend circumferentially in a plane oriented generally parallel to the first end opening 66 and the second end opening 68. The first part 70 of the gap closing device may have a first length 76 measured in a direction perpendicular to the first end 62 and the second part 72 may have a second length 77 which is measured perpendicular to the second end 64. Illustratively, the first length may measure between approximately 5 inches to approximately 20 inches, and the second length may measure between approximately 1 inch and approximately 4 inches.

Advantageously, the gap closing device 60 may be sold to a consumer with the first 70 and second 72 parts integrally connected together, and may be separated along the line of weakness 74 after purchase for suitable use, such as will be described. The first part 70 may be positioned about the ice hole sleeve as described herein, and the second part 72 may be positioned on the hole cover 50 to close gaps between the hole cover and the opening 14 in the floor. In one implementation, the second part 72 may be positioned on an outer surface of the peripheral wall portion 58 of the hole cover 50 to help close any gap between the peripheral wall portion and the edge 18 of the opening in the floor, or in some cases any gap between the peripheral wall portion and the ice hole ring. In another implementation, the second part may be positioned on the disk portion 52 of the hole cover 50, such as a position straddling the peripheral edge 54 of the disk portion such that sections of the second part 72 are located on either side of the edge 54.

In some implementations of the gap closing device 60, a circumferentially extending portion 75 of the device 60 may be folded over another circumferentially extending portion of the device to adjust an effective length of the device when in position on the ice hole sleeve 20, such that the effective length of the device generally corresponds to, for example, the distance between the bottom face 38 of sleeve flange 36 and the upper ice surface 5.

In some embodiments of the gap closing device 60, at least one grip tab 78 may extend outwardly from one of the ends 62, 64 of the device 60 so that the tab 78 may extend outwardly from between the sleeve flange 36 of sleeve 20 and the flange of the ice hole ring 40 or the edge 18 of the opening 14 in the floor. The grip tab 78 advantageously allows for pulling upwardly on the tab to thereby pull oppositely on the gap closing device and effectively let lift the gap closing device as well as the ice hole sleeve 20 upwardly out of the opening of the floor. In some preferred embodiments, a pair of grip tab 78, 80 may be positioned at opposite locations on the same end opening of the gap closing device to provide a plurality of locations to grip and pull up on the device 60.

In use, when the gap closing device 60 is positioned on the ice hole sleeve, an upper circumferential portion of the device may close or diminish in size any annular gap between the upper portion of the sleeve 20 and the edge 18 of the opening 14, or, if an ice hole ring 40 is employed on the opening, any gap between the upper portion of the sleeve 20 and the ring 40. A lower portion of the gap closing device 60 may abut against the upper ice surface 5 of the layer 3 of ice, and in some implementations a portion of the lower portion may be folded back upon itself to adjust the effective length of the device 62 the position of the upper ice surface 5 with respect to the floor 14. The presence of the device 60 may also serve to restrict air movement from contacting the ice hole sleeve 20 so that the sleeve inward face 32 may have a temperature that is greater than if the device 62 is not employed.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system for situating relative to a hole formed in a layer of ice extending over a body of water, the layer of ice having an upper ice surface, the system comprising:
    an ice fishing apparatus for positioning above the layer of ice adjacent to the hole, the ice fishing apparatus comprising:
        a floor configured to being positioned in an elevated condition spaced above the upper ice surface of the layer of ice, the floor having an opening positionable in registration with the hole formed in the layer of ice;
    an ice hole sleeve removably positioned in the opening of the floor to extend down toward the upper ice surface, the ice hole sleeve having a top with an upper sleeve opening and a bottom with a lower sleeve opening, the ice hole sleeve including a sleeve wall extending through the opening of the floor and extending downwardly from the floor, the sleeve wall being formed of rigid material and having a sleeve inward face and a sleeve outward face on opposite sides of the sleeve wall; and
    a gap closing device having a tubular configuration with an endless circumference and being positioned on the sleeve outward face of the ice hole sleeve to facilitate closure of a gap associated with the opening in the floor; and
    wherein the gap closing device extends beyond at least one of the top and the bottom of the ice hole sleeve when the ice hole sleeve is inserted into the opening in the floor, a circumferentially-extending portion of the gap closing device being folded over another circumferentially-extending portion of the gap closing device to form a fold in a material forming the gap closing device and thereby reduce an effective length of the gap closing device between an upper end of the gap closing device and the fold to facilitate adjustment of the effective length of the gap closing device to a distance between a sleeve flange of the ice hole sleeve and the upper ice surface of the layer of ice for positioning the fold adjacent to the upper ice surface of a layer of ice such that the fold in the material is restable on the upper ice surface.

2. The system of claim 1 wherein the gap closing device is positioned between the sleeve wall and an edge of the opening in the floor.

3. The system of claim 1 wherein the gap closing device is resiliently compressible.

4. The system of claim 3 wherein the gap closing device is stretchable in a circumferential direction to increase a circumferential length of the device.

5. The system of claim 1 wherein a circumferentially-extending portion of the gap closing device is folded over another circumferentially-extending portion of the gap closing device and positioned adjacent to the upper ice surface.

6. The system of claim 1 wherein the gap closing device is configured to separate into two parts including a first part and a second part, each of the two parts having a tubular configuration, the first part having a first end of the gap closing device and the second part having a second end of the gap closing sleeve.

7. The system of claim 6 wherein the gap closing device has a line of weakness permits the gap closing device to be separated into the two parts from a single piece, the line of weakness extending circumferentially in a plane parallel to an end opening of the device.

8. The system of claim 7 wherein the gap closing device includes:
    at least one grip tab extending outwardly from one of the first end or the second end of the gap closing device so that the at least one grip tab may extend outwardly from between the ice hole sleeve and the opening of the floor such that pulling upwardly on the at least one grip tab pulls upwardly on the gap closing device and lifts the gap closing device as well as the ice hole sleeve upwardly out of the opening in the floor.

9. The system of claim 8 wherein the at least one grip tab comprises a pair of grip tabs positioned at opposite locations on the same said end opening of the gap closing device.

10. The system of claim 1 wherein the gap closing device has a first end opening at first end of the gap closing device and a second end opening at a second end of the gap closing device, the gap closing device having a substantially uniform width between the first and second end openings.

11. The system of claim 1 wherein the ice fishing apparatus includes an ice hole ring inserted into the opening in the floor for interposing between the ice hole sleeve and the opening in the floor; and
wherein a portion of the gap closing device is positioned between the ice hole ring and the ice hole sleeve to close a gap between the ice hole ring and the ice hole sleeve.

12. The system of claim 1 wherein the ice fishing apparatus includes a hole cover removably positionable on the floor to cover the opening in the floor, the hole cover having a disk portion having a peripheral edge and a peripheral edge section extending along the peripheral edge of the disk portion, and a peripheral wall portion at least partially positionable in the opening of the floor;
wherein a portion of the gap closing device is positioned on the peripheral edge of the hole cover so as to be positioned between the hole cover and the opening in the floor to close a gap between the hole cover and the opening in the floor.

13. An ice fishing apparatus for closing a gap associated with an opening in a floor of an ice fishing structure, the apparatus comprising:
an ice hole sleeve for removably positioning in the opening of the floor to extend down toward an upper ice surface, the ice hole sleeve having a top with an upper sleeve opening and a bottom with a lower sleeve opening, the ice hole sleeve including a sleeve wall for extending through the opening of the floor and downwardly from the floor, the sleeve wall being formed of a rigid material and having a sleeve inward face and a sleeve outward face on opposite sides of the sleeve wall, the outward face of the sleeve wall has a substantially frustra-conical shape; and
a gap closing device having a tubular configuration with an endless circumference and being positioned on the sleeve outward face of the ice hole sleeve to facilitate closure of a gap associated with the opening in the floor;
wherein the gap closing device is resiliently compressible and stretchable in a circumferential direction to increase a circumferential length of the device to conform the tubular configuration of the gap closing device to the substantially frustoconical shape of the outward face of the sleeve wall; and
wherein a circumferentially-extending portion of the gap closing device is folded over another circumferentially-extending portion of the gap closing device to form a fold in a material forming the gap closing device and thereby reduce an effective length of the gap closing device between an upper end of the gap closing device and the fold to facilitate adjustment of the effective length of the gap closing device to a distance between a sleeve flange of the ice hole sleeve and the upper ice surface of the layer of ice for positioning the fold adjacent to the upper ice surface of a layer of ice such that the fold in the material is restable on the upper ice surface.

14. The apparatus of claim 13 wherein the gap closing device includes:
at least one grip tab extending outwardly from an end of the gap closing device so that the at least one grip tab may extend outwardly from between the ice hole sleeve and the opening of the floor such that pulling upwardly on the at least one grip tab pulls upwardly on the gap closing device and lifts the gap closing device as well as the ice hole sleeve upwardly out of the opening in the floor.

15. The apparatus of claim 14 wherein the at least one grip tab comprises a pair of grip tabs positioned at opposite locations on the same end of the gap closing device.

16. The apparatus of claim 13 wherein the gap closing device is configured to separate into two parts including a first part and a second part, each of the two parts having a tubular configuration, the first part having a first end of the gap closing device and the second part having a second end of the gap closing sleeve.

17. The apparatus of claim 15 wherein the gap closing device has a line of weakness permits the gap closing device to be separated into the two parts from a single piece, the line of weakness extending circumferentially in a plane parallel to the end of the device.

18. A system for situating relative to a hole formed in a layer of ice over a body of water with an upper ice surface and a floor positioned in an elevated condition spaced above the upper ice surface of the layer of ice, the floor having an opening positionable in registration with the hole formed in the layer of ice, the system comprising:
an ice fishing apparatus with an ice hole sleeve removably positioned in the opening of the floor to extend down toward the upper ice surface, the ice hole sleeve having a top with an upper sleeve opening and a bottom with a lower sleeve opening, the ice hole sleeve including a sleeve wall extending through the opening of the floor and extending downwardly from the floor, the sleeve wall being formed of a rigid material and having a sleeve inward face and a sleeve outward face on opposite sides of the sleeve wall; and
a gap closing device having a tubular configuration with an endless circumference and extending about the ice hole sleeve, the gap closing device being formed of a material stretchable to provide intimate contact of the gap closing device with the sleeve outward face of the ice hole sleeve, the material of the gap closing device being resiliently compressible to facilitate conformance of the gap closing device to a gap between the sleeve outward face of the ice hole sleeve and an edge forming the opening in the floor to facilitate closure of the gap; and
wherein the gap closing device extends beyond at least one of the top and the bottom of the ice hole sleeve when the ice hole sleeve is inserted into the opening in the floor, a circumferentially-extending portion of the gap closing device being folded over another circumferentially-extending portion of the gap closing device to form a fold in a material forming the gap closing device and thereby reduce an effective length of the gap closing device between an upper end of the gap closing device and the fold to facilitate adjustment of the effective length of the gap closing device to a distance between a sleeve flange of the ice hole sleeve and the upper ice surface of the layer of ice for positioning the fold adjacent to the upper ice surface of a layer of ice such that the fold in the material is restable on the upper ice surface.

\* \* \* \* \*